United States Patent
Baba

(10) Patent No.: US 12,330,645 B2
(45) Date of Patent: Jun. 17, 2025

(54) CONTROL DEVICE, CONTROL METHOD, AND CONTROL PROGRAM PRODUCT

(71) Applicant: DENSO CORPORATION, Kariya (JP)

(72) Inventor: Atsushi Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 212 days.

(21) Appl. No.: 18/150,107

(22) Filed: Jan. 4, 2023

(65) Prior Publication Data
US 2023/0143805 A1    May 11, 2023

Related U.S. Application Data

(63) Continuation of application No. PCT/JP2021/024176, filed on Jun. 25, 2021.

(30) Foreign Application Priority Data

Jul. 7, 2020   (JP) .................................. 2020-117149

(51) Int. Cl.
*B60W 30/14*   (2006.01)
*B60W 30/09*   (2012.01)
(Continued)

(52) U.S. Cl.
CPC .......... *B60W 30/146* (2013.01); *B60W 30/09* (2013.01); *B60W 30/0956* (2013.01);
(Continued)

(58) Field of Classification Search
CPC .............. B60W 30/146; B60W 30/09; B60W 30/0956; B60W 30/18154; B60W 30/143;
(Continued)

(56) References Cited

U.S. PATENT DOCUMENTS 8,761,991 B1 *   6/2014   Ferguson ......... G08G 1/096758
                                                                701/28
9,459,623 B1 *  10/2016   Raghu ............. B60W 30/18154
(Continued)

FOREIGN PATENT DOCUMENTS

CN   112829762 A  *  5/2021 .......... B60W 40/105
JP   2012-216143 A    11/2012
(Continued)

OTHER PUBLICATIONS

Lin et al.; Decision Making through Occluded Intersections for Autonomous Driving; 2019 IEEE Intelligent Transportation Systems Conference (ITSC) Auckland, NZ, Oct. 27-30, 2019; pp. 2449-2455 (Year: 2019).*
(Continued)

*Primary Examiner* — Michael J Zanelli
(74) *Attorney, Agent, or Firm* — Maschoff Brennan

(57) ABSTRACT

A control device, which controls a velocity of a vehicle, is configured to: determine a scene in which a visibility is limited by an occluding object at an intersection where a traveling road of the vehicle intersects with an intersecting road; determine whether the vehicle on the traveling road has a right of way; and control the velocity of the vehicle to stop immediately before the intersection when the vehicle on the traveling road has no right of way.

16 Claims, 8 Drawing Sheets

(51) Int. Cl.
  *B60W 30/095* (2012.01)
  *B60W 30/18* (2012.01)
(52) U.S. Cl.
  CPC ............... *B60W 30/18154* (2013.01); *B60W 2554/4041* (2020.02)
(58) Field of Classification Search
  CPC . B60W 2554/4041; B60W 2554/4042; B60W 2555/60; B60W 2720/10
  See application file for complete search history.

(56) References Cited

U.S. PATENT DOCUMENTS

| | | | |
|---|---|---|---|
| 2007/0035416 | A1 | 2/2007 | Tanaka et al. |
| 2009/0109061 | A1* | 4/2009 | McNew ............... G08G 1/164 340/928 |
| 2009/0326751 | A1 | 12/2009 | Otake et al. |
| 2011/0102195 | A1 | 5/2011 | Kushi et al. |
| 2016/0176399 | A1 | 6/2016 | Takagi |
| 2019/0384302 | A1* | 12/2019 | Silva ............... B60W 60/00272 |
| 2020/0035102 | A1* | 1/2020 | Satomura ............. G06V 20/588 |
| 2021/0061269 | A1* | 3/2021 | Petroff ................. B60W 40/04 |
| 2021/0155241 | A1* | 5/2021 | Joseph ................ B60W 30/181 |
| 2021/0263519 | A1* | 8/2021 | Ogino ............... B60W 60/0015 |

FOREIGN PATENT DOCUMENTS

| | | |
|---|---|---|
| JP | 2018-173800 A | 11/2018 |
| JP | 2019-067295 A | 4/2019 |
| WO | 2018/115963 A2 | 6/2018 |
| WO | 2019/180506 A2 | 9/2019 |

OTHER PUBLICATIONS

Narksri et al.; Crossing Blind Intersections from a Full Stop Using Estimated Visibility of Approaching Vehicles; 2019 IEEE Intelligent Transportation Systems Conference (ITSC) Auckland, NZ, Oct. 27-30, 2019; pp. 2427-2434 (Year: 2019).*

Orzechowski et al.; Tackling Occlusions & Limited Sensor Range with Set-based Safety Verification; 2018 21st Intl. Conf. on Intelligent Transportation Systems (ITSC) (Year: 2018).*

* cited by examiner

CONTROL DEVICE, CONTROL METHOD, AND CONTROL PROGRAM PRODUCT

CROSS REFERENCE TO RELATED APPLICATIONS

The present application is a continuation application of International Patent Application No. PCT/JP2021/024176 filed on Jun. 25, 2021, which designated the U.S. and claims the benefit of priority from Japanese Patent Application No. 2020-117149 filed on Jul. 7, 2020. The entire disclosures of all of the above applications are incorporated herein by reference.

TECHNICAL FIELD

The present disclosure relates to a technology that enables a vehicle to properly pass through an intersection.

BACKGROUND

Conventionally, there has been known a system that assists driving of a vehicle when the vehicle enters an intersection by calculating a risk of contact with a different vehicle.

SUMMARY

The present disclosure provides a control device, which controls a velocity of a vehicle. The control device is configured to: determine a scene in which a visibility is limited by an occluding object at an intersection where a traveling road of the vehicle intersects with an intersecting road; determine whether the vehicle on the traveling road has a right of way; and control the velocity of the vehicle to stop immediately before the intersection when the vehicle on the traveling road has no right of way.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
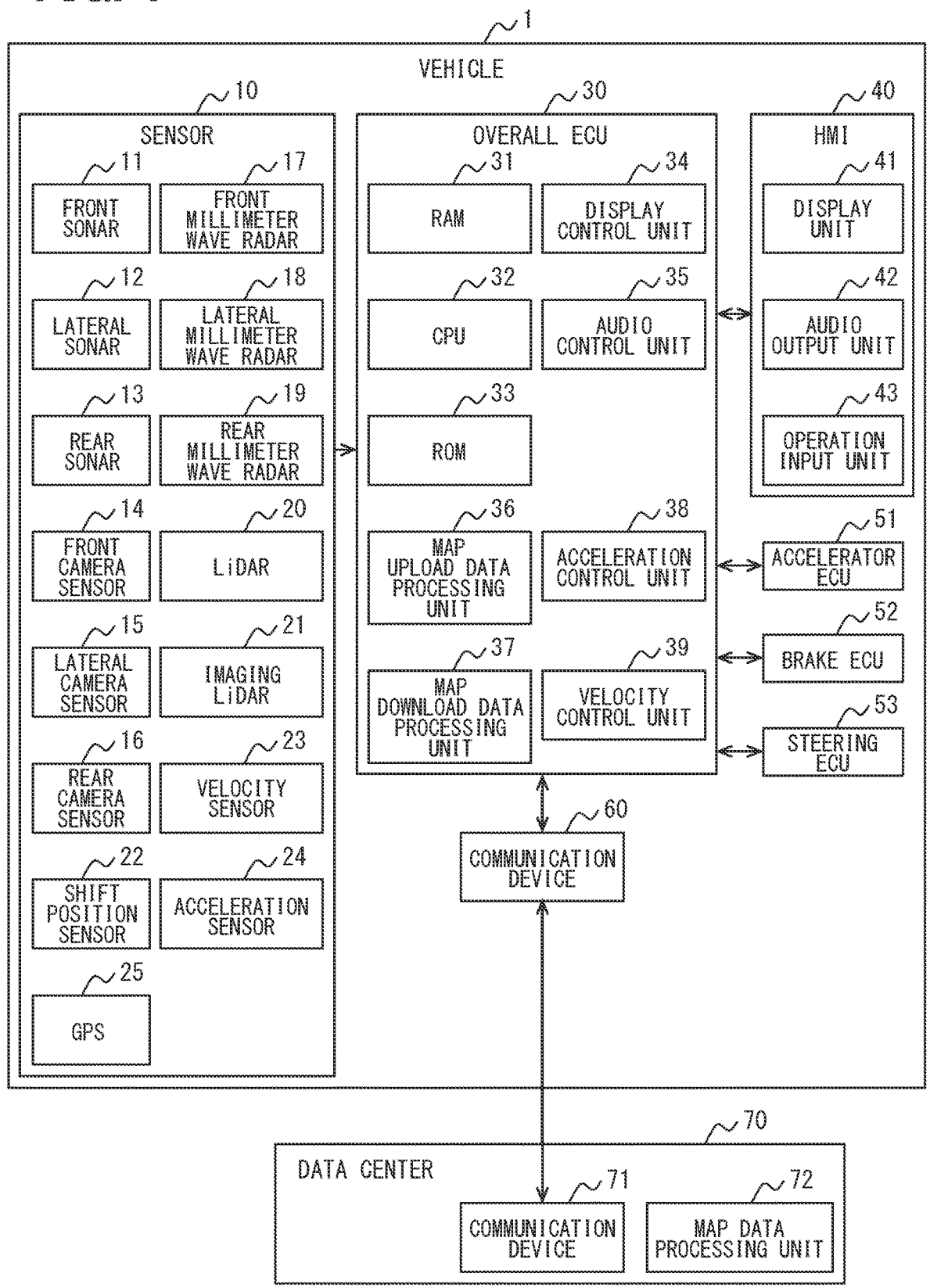
FIG. 1 is a diagram showing a system configuration of an autonomous driving vehicle according to an embodiment.

As described above, a conventional driving assist system assists driving of a vehicle when the vehicle enters an intersection by calculating a risk of contact with a different vehicle. For example, the driving assist system navigates a vehicle based on rules defining liability for accidents, and specifically discloses a navigation of vehicle at an intersection.

As another example, a driving assist device determines whether a vehicle is allowed to enter an intersection with a high reliability. In this case, the driving assist device calculates a contact risk based on an intersection passing duration of ego vehicle and an intersection passing duration of another vehicle. When the contact risk is equal to or lower than a threshold, the system controls the ego vehicle to enter the intersection.

After studying on the conventional driving assist device, the inventor of the present disclosure found out that the conventional art fails to disclose how to travel through the intersection when a visibility at the intersection is limited due to an occluding object.

According to the present disclosure, at a location where multiple roads intersect with one another, such as an intersection, when a visibility is limited by an occluding object and information about an occluded area cannot be obtained, a traveling control is executed in an autonomous driving vehicle for properly passing through the intersection.

According to an aspect of the present disclosure, a control device, which controls a velocity of a vehicle, includes: a scene determination unit determining a scene in which a visibility is limited by an occluding object at an intersection where a traveling road of the vehicle intersects with an intersecting road, the scene determination unit further determining whether the vehicle on the traveling road has a right of way; and a control unit controlling the velocity of the vehicle to stop immediately before the intersection when the vehicle on the traveling road has no right of way.

According to another aspect of the present disclosure, a control device, which controls a velocity of a vehicle, includes a virtual moving object setting unit setting, in a scene where a visibility is limited by an occluding object at an intersection where a traveling road of the vehicle intersects with an intersecting road, an intersecting moving object at a position closest to the intersection within an area occluded by the occluding object; a velocity evaluation unit setting a velocity of the intersecting moving object; and a control unit controlling the velocity of the vehicle to not collide with the intersecting moving object based on the position and the velocity of the intersecting moving object.

With the above configuration, at the intersection where the occluding object exists, the proper traveling control can be performed on the autonomous driving vehicle even in a case where the intersecting moving object exists in the occluded area of the occluding object and information about the intersecting moving object cannot be obtained.

The following will describe a vehicle equipped with a control device according to an embodiment of the present disclosure with reference to the accompanying drawings. The vehicle may be an autonomous driving vehicle or a vehicle with driving assist function. In the present embodiment, an autonomous driving vehicle will be described as an example.

FIG. 1 is a diagram showing a system configuration of the autonomous driving vehicle 1 according to the present embodiment. The autonomous driving vehicle 1 according to the present embodiment includes an overall electronic control unit (ECU) 30 that performs autonomous driving control, a sensor 10 that detects conditions of the vehicle and surrounding environment, various other ECUs that control respective vehicle devices according to instructions from the overall ECU 30, a human machine interface (HMI) 40 providing an interface with a driver, and a communication device 60 that communicates with a data center 70. The autonomous driving vehicle 1 may further include a communication device that performs V2X communication, such as vehicle-to-vehicle communication or vehicle-to-infrastructure communication.

As various ECUs, FIG. 1 shows an accelerator ECU 51, a brake ECU 52, and a steering ECU 53. The autonomous driving vehicle 1 may further include other type ECUs that are not shown in FIG. 1. The HMI 40 includes a display unit 41 that displays information to the driver, an audio output unit 42 that outputs an audio signal, and an operation input unit 43 that receives operation made by the driver or an occupant of the vehicle. The overall ECU 30 and various other ECUs each may include at least one special purpose computer, separately from one another. Alternatively, the overall ECU 30 and various other ECUs may be provided by, in common, at least one special purpose computer. The special purpose computer has at least one memory and at least one processor. The memory is at least one type of computer-readable non-transitory tangible storage medium, such as a semiconductor memory, a magnetic medium, an optical medium, for non-transitory storage of computer readable programs and data. For example, the memory may be provided by RAM or ROM. The processor may include at least one of a CPU, a GPU, and a RISC-CPU as a core. For example, the special purpose computer may include at least one of a digital circuit or an analog circuit as the processor.

The sensor 10 includes, as sensor elements that detect objects existing outside of the vehicle, a front sonar 11, a lateral sonar 12, a rear sonar 13, a front camera sensor 14, a lateral camera sensor 15, a rear camera sensor 16, a front millimeter wave radar 17, a lateral millimeter wave radar 18, a rear millimeter wave radar 19, a LiDAR 20, and an Imaging LiDAR 21. The sensor 10 may include, as sensor elements that detect vehicle state, a shift position sensor 22, a velocity sensor 23, and an acceleration sensor 24. The sensor 10 may include a GPS 25 that measures a position of the vehicle. The autonomous driving vehicle 1 may be equipped with other sensors not shown in FIG. 1.

The overall ECU 30 includes a RAM 31, a CPU 32, a ROM 33, a display control unit 34, an audio control unit 35, a map upload data processing unit 36, a map download data processing unit 37, an acceleration control unit 38, and a velocity control unit 39. The overall ECU 30 calculates a velocity range that enables the vehicle to safely pass through an intersection on a road with intersection. In the following description, a road that intersects the road on which the ego vehicle is traveling is referred to as an intersecting road, and a vehicle traveling on the intersecting road is referred to as an intersecting vehicle. The intersecting vehicle is an example of an intersecting moving object. The intersecting vehicle may correspond to other road users or safety-relevant object.

The overall ECU 30 corresponds to a control device. A part of the overall ECU 30 may correspond to the control device, or a combination of the overall ECU 30 and various ECUs may correspond to the control device. The display control unit 34 and the audio control unit 35 communicate with the HMI 40, and control the HMI 40 to function as a user interface with the driver. The acceleration control unit 38 and the velocity control unit 39 communicate with the accelerator ECU 51 and the brake ECU 52 to control an accelerator and a brake of the vehicle. The map upload data processing unit 36 and the map download data processing unit 37 communicate with the data center 70 through the communication device 60 to upload and download map data.

The data center 70 includes a communication device 71 and a map data processing unit 72. The map data processing unit 72 of the data center 70 processes the map data uploaded from the vehicle, and updates the stored map data to the latest map data. The data center 70 distributes the latest map data to the vehicle periodically or in response to a request from the vehicle.

Figure 2:
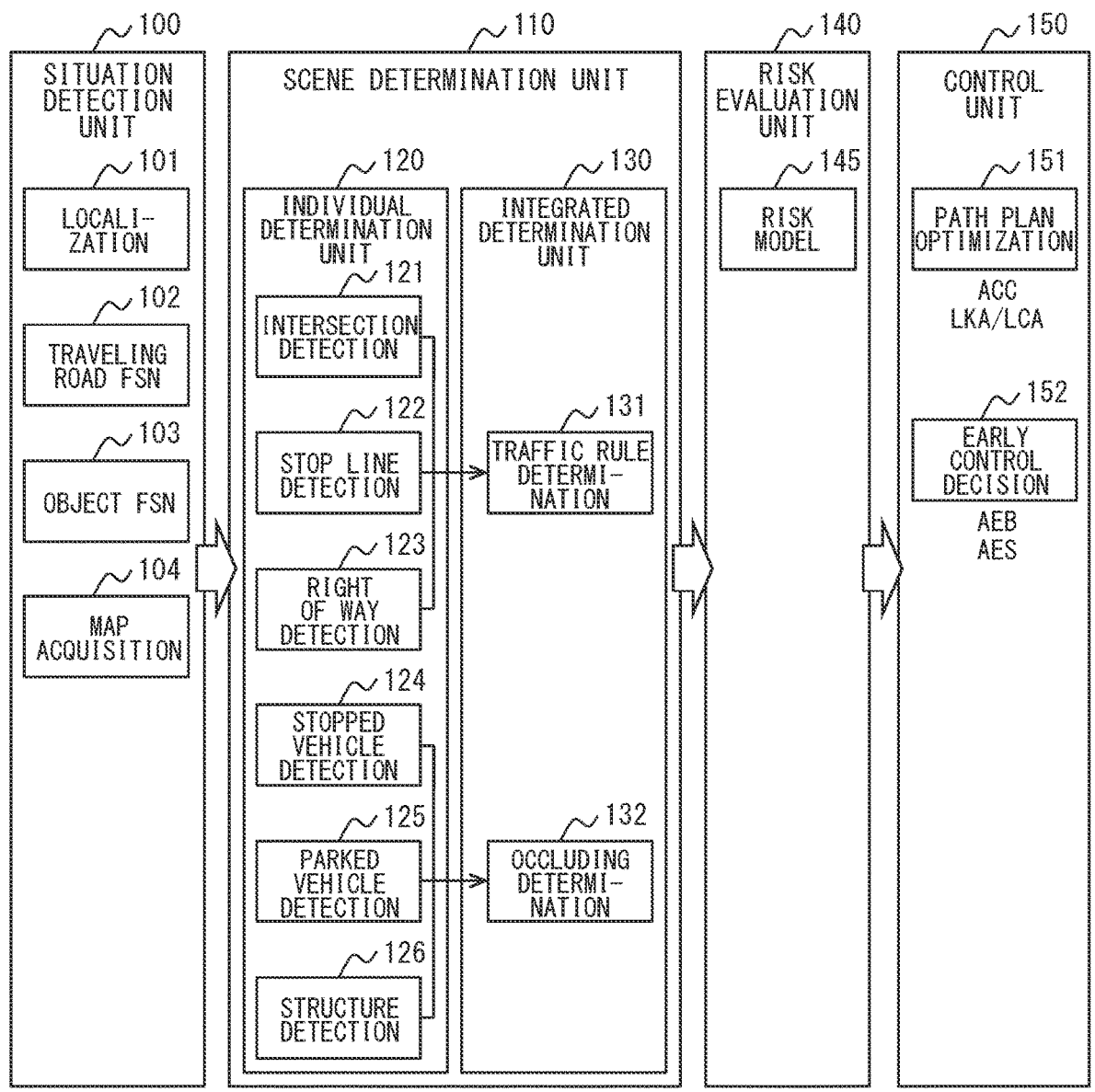
FIG. 2 is a diagram showing a configuration of an application used by an autonomous driving vehicle according to an embodiment.

FIG. 2 is a diagram showing a configuration of an application used by the autonomous driving vehicle 1 according to the present embodiment. The application is implemented by the CPU 32 when the CPU executes a program stored in the RAM 31 or the ROM 33. The program executed by the CPU as the application is also included in the scope of the present disclosure.

The application includes a situation detection unit 100, a scene determination unit 110, a risk evaluation unit 140, and a control unit 150. The situation detection unit 100 executes localization 101, traveling road FSN (Fusion) 102, object FSN (Fusion) 103, and map acquisition 104. The localization 101 is a function of specifying a traveling position of the ego vehicle on the map. The traveling road FSN 102 is a function of specifying a traveling lane (traveling road) where the ego is required to travel by combining data from multiple sensors 10. The object FSN 103 is a function of specifying a different vehicle on the road, a pedestrian, a sign installed on roadside, a traffic signal or the like by combining data from multiple sensors 10. The map acquisition 104 acquires map data around the current position.

The scene determination unit 110 includes an individual determination unit 120 and an integrated determination unit 130. The scene determination unit 110 determines an environment in which the vehicle is traveling. The environment to be determined includes at least one of a scenario or a scene. The individual determination unit 120 executes intersection detection 121, stop line detection 122, right of way detection 123, stopped vehicle detection 124, parked vehicle detection 125, and structure detection 126.

The right of way detection 123 in the individual determination unit 120 is a function of detecting whether the vehicle has right of way to travel the road based on presence or absence of a priority road sign or a road sign indicating intersecting road is priority road. When the priority road sign exists, the road on which the ego vehicle is traveling is determined to have the right of way, that is, the traveling road of ego vehicle is determined as priority road. When the road sign indicating intersecting road is priority road, such as stop sign or slowdown sign exists, the intersecting road is determined to have the right of way, that is, the intersecting road is determined as priority road.

When presence of traffic signs, such as "4-way stop" or "all-way stop" used in United States is determined, each road is determined as non-priority road. Under the right-hand traffic, the right of way is given to a vehicle that enters the intersection from the road on right side relative to ego vehicle, and the ego vehicle has the right of way with respect to the vehicle entering the intersection from the road on left side. The examples described here is based on the premise of right-hand traffic.

The right of way detection 123 may specify the current traveling road of ego vehicle based on map data, and detect whether the current traveling road of ego vehicle has the right of way based on the road information. The right of way detection may detect whether the ego vehicle has the right of way, that is, the traveling road of ego vehicle is the priority road according to a color of traffic light.

The integrated determination unit 130 executes an integrated determination based on various determination results determined by the individual determination unit 120. Specifically, the integrated determination unit executes traffic rule determination 131 and occluding determination 132. As the traffic rule determination 131, when the intersection or a merging point is detected by the intersection detection 121 ahead the ego vehicle on the traveling road, the integrated determination unit integrally determines which road has the right of way among the traveling road of ego vehicle and the intersecting road based on detection results of stop line detection 122 and right of way detection 123.

The following will describe an example a determination logic of the traffic rule determination 131. First, when the right of way related to the currently traveling road of ego vehicle is detected as the right of way detection 123 by the individual determination unit 120, the individual determination unit 120 determines whether the road has the right of way or not based on the detection result. When the detection result of right of way detection 123 is unknown (for example, when a priority road sign or a road sign indicating intersecting road is priority road is not detected), the detection result in stop line detection 122 is used to determine the right of way. When the traveling road or the intersecting road has the stop line, the road without stop line is determined as the priority road, and the road with stop line is determined as the non-priority road. When a center line of the road extends through the intersection where the intersecting road is merged, the road with the center line extending through the intersection is determined as the priority road. When neither the traveling road of ego vehicle nor the intersecting road has a stop line or the center line does not extend through the intersection, the road having a larger width may be determined as the priority road. The road width may be determined based on the sensor data acquired by the sensor 10 of the autonomous driving vehicle 1, or may be determined based on the map data acquired by the map acquisition 104. When priority road cannot be determined based on the above-described criteria, it is determined that the vehicle coming from the left side road has the right of way. This example is described on the premise of left-hand traffic as in Japan. In a country where the right-hand traffic is adopted, for example, the vehicles coming from the right side road may be determined to have the right of way corresponding to the right-hand traffic rule.

Figure 3A:
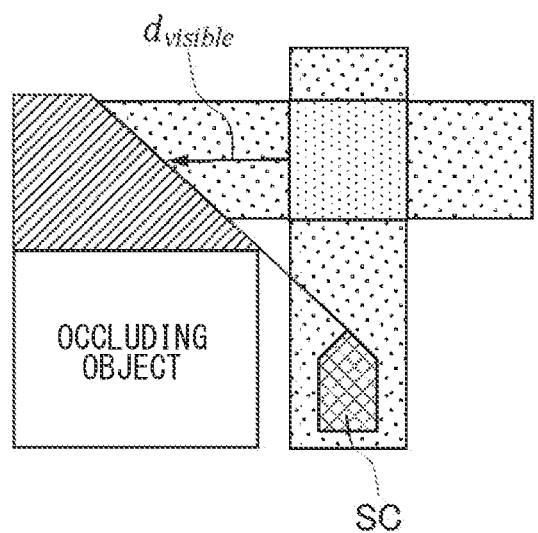
FIG. 3A is a diagram showing a state in which a visibility of an intersecting road is limited by an occluding object.
Figure 3B:
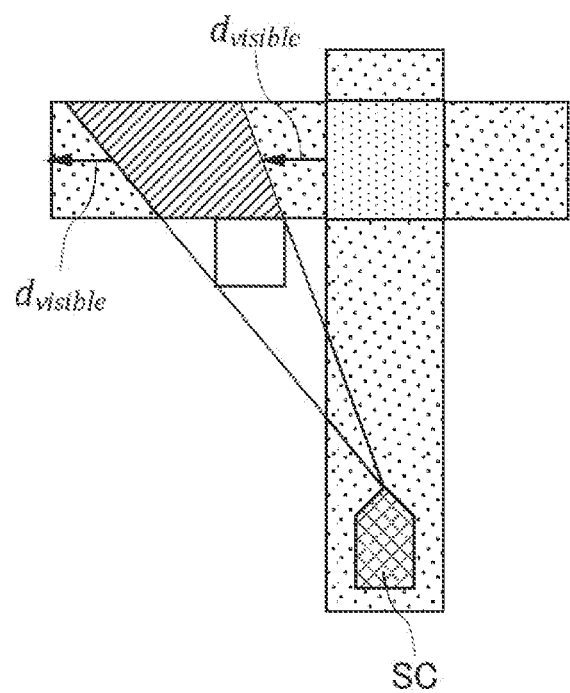
FIG. 3B is a diagram showing a state in which a visibility of an intersecting road is limited by an occluding object.

The occluding determination 132 is executed based on the detection results of the stopped vehicle detection 124, the parked vehicle detection 125, and the structure detection 126. When the visibility of the intersecting road is limited, an occluded area of the intersecting road is determined. Each of FIG. 3A and FIG. 3B is a diagram showing a state in which visibility of the intersecting road is limited by an occluding object. As shown in FIG. 3A, by extending a straight line connecting ego vehicle SC and an edge of the occluding object toward the intersection, it is possible to determine which area of the intersecting road is visible and which area is occluded. The occluding object may include a roadside building, a tree, a hill, a different vehicle traveling on the road (for example, another vehicle traveling in an adjacent lane of ego vehicle). When the traveling road of ego vehicle has sharp curve ahead, the visibility may be determined to be limited.

In FIG. 3A, the area indicated by $d_{visible}$ is visible area, and the area occluded by the occluding object is invisible. As shown in FIG. 3B, when the occluding object is far from the ego vehicle SC, or when the occluding object is small (not shown), the other end of the occluding object may also be connected with the ego vehicle SC by a straight line, and the straight line may be extended toward the intersection to determine the visible area and invisible area of the intersecting road.

The application of the autonomous driving vehicle 1 will be described with reference to FIG. 2. The risk evaluation unit 140 uses a risk model 145 to execute risk evaluation.

Figure 4:
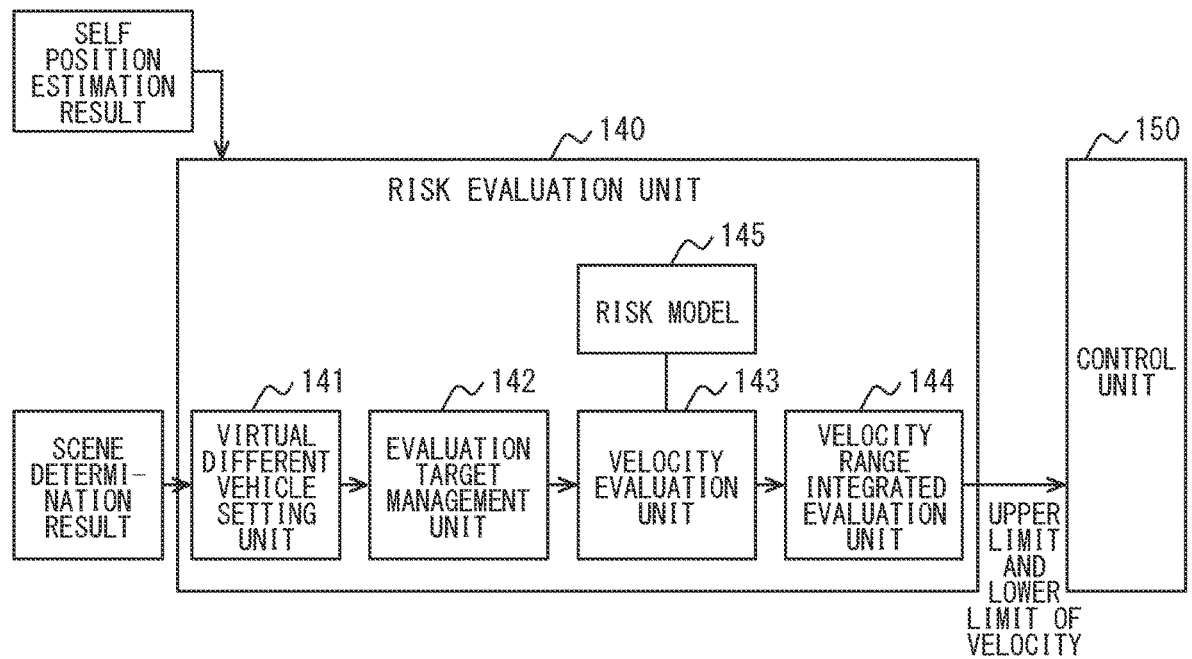
FIG. 4 is a diagram showing a configuration of a risk evaluation unit.

FIG. 4 is a diagram showing a configuration of the risk evaluation unit 140. The risk evaluation unit 140 is configured to receive a self-position estimation result and the scene determination result, evaluate the risk at the intersection, and transmit velocity data indicating upper limit and lower limit to the control unit 150.

The velocity range calculated by the risk evaluation unit 140 is a velocity range that allows the vehicle to safely pass through the intersection in relation to a virtual different vehicle even in a case where a different vehicle is blocked by the occluding object. In other words, when the vehicle travels within this velocity range, even in a case where a different vehicle exists in the occluded area, the vehicle can avoid a collision with the vehicle blocked by the occluding object. Hereinafter, this velocity range will be referred to as "safe velocity range".

In addition, the "safe velocity range" is set to a range that allows an appropriate distance (for example, a safe distance) to be maintained with respect to a virtual different vehicle, that is, a range which can avoid violation of a safety envelope. The safety envelope defines a set of limits and conditions, within which the system is designed to avoid conflict and operate, subject to constraints or controls, in order to maintain operations within a level of acceptable risk. The safety envelope may define a set of limits and conditions within which the vehicle should operate, typically combined with defined assumptions about the reasonably foreseeable worst case behavior of others, to provide a foundational building block of a safety-related model.

The risk evaluation unit 140 includes a virtual different vehicle setting unit 141, an evaluation target management unit 142, a velocity evaluation unit 143, a velocity range integrated evaluation unit 144, and a risk model 145. The virtual different vehicle setting unit 141 sets a virtual different vehicle in an area occluded by the occluding object.

Figure 5A:
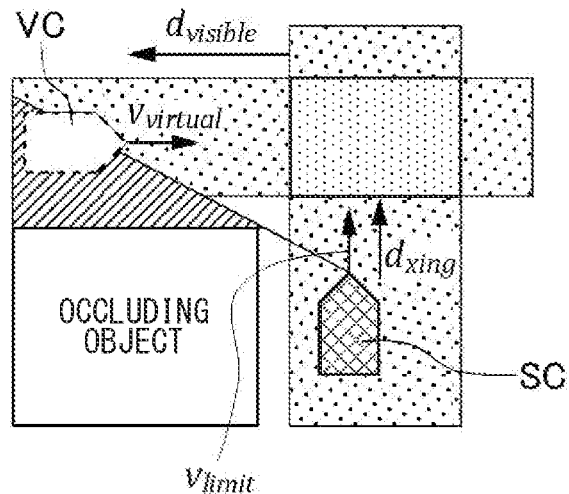
FIG. 5A is a diagram showing an example in which a virtual different vehicle is set within an occluded area by a virtual different vehicle setting unit.
Figure 5B:
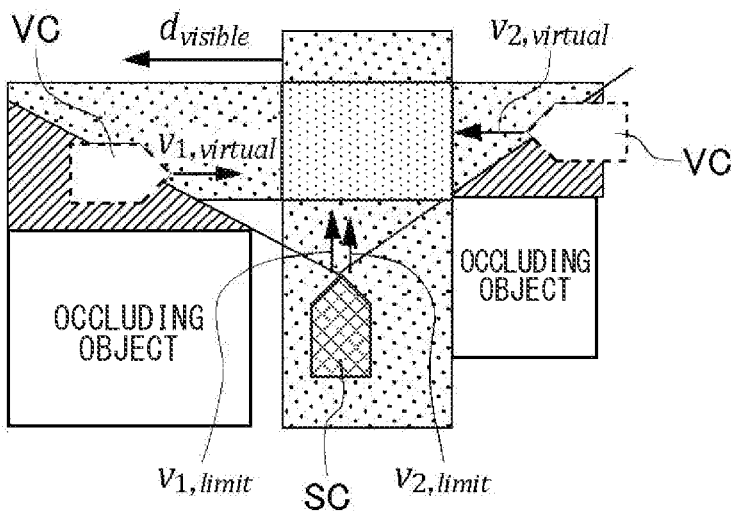
FIG. 5B is a diagram showing an example in which a virtual different vehicle is set within an occluded area by a virtual different vehicle setting unit.

Each of FIG. 5A and FIG. 5B is a diagram showing an example in which a virtual different vehicle is set within an occluded area by the virtual different vehicle setting unit 141. The virtual different vehicle setting unit 141 sets the virtual different vehicle VC at the position closest to the intersection within the area occluded by the occluding object. FIG. 5A shows an example in which one virtual different vehicle VC is set for one occluded area. FIG. 5B shows an example in which two virtual different vehicles VC are set for two occluded areas, respectively. In this way, the virtual different vehicle setting unit 141 sets one or more virtual different vehicles VC according to the number of occluded areas. Within the occluded area, the virtual different vehicle may be set at a different position from the position closest to the intersection under a condition that a reasonably foreseeable position is set. In addition to the virtual vehicle VC, a virtual pedestrian may be set as a safety-relevant object in an occluded pedestrian crossing, or a virtual bicycle may be set as the safety-relevant object in an occluded bicycle lane.

The above-described process determines a scenario or a scene in which the vehicle is placed, assumes that the safety-relevant object will appear from the occluded area as a dynamic element, and determines the right of way (priority) between ego vehicle and the safety-relevant object according to traffic law. The determination of the scenario or the scene may also be referred to as a selection of scenario or scene. The scenarios are not mutually exclusive, and multiple scenarios can be combined to represent more complex driving situation. For example, when the vehicle is traveling on a highway, which has two traveling lanes in each direction, and is approaching a junction, a scenario of highway in which different vehicles travel in the adjacent lane may be combined with a scenario of highway in which the junction has an occluded area. Under this situation, the overall ECU 30 may assume that the virtual vehicle VC will appear from the occluded area.

The evaluation target management unit 142 manages, as a risk evaluation target, a vehicle traveling on the intersecting road. When partial area of the intersecting road is occluded the occluding object, the vehicle traveling on the intersecting road may be blocked by the occluding object and become invisible. When the vehicle traveling on the intersecting road travels out of the occluded area, the vehicle becomes visible again. The vehicle traveling on the intersecting road may also be referred to as an intersecting vehicle. In this case, the evaluation target management unit 142 manages the intersecting vehicle as the risk evaluation target. Thus, even when the intersecting vehicle is occluded by the occluding object, the traveling position can be accurately predicted based on the traveling state of the intersecting vehicle within the visible area. The evaluation target management unit 142 may also manage a vehicle traveling on the intersecting road with good visibility and with no occluding object.

The velocity evaluation unit 143 evaluates the upper limit or lower limit of the velocity of ego vehicle set under the premise that the ego vehicle can avoid collision with the virtual different vehicle VC. As described above, the virtual different vehicle is set by the virtual different vehicle setting unit 141. The velocity evaluation unit 143 uses the risk model 145 when evaluating the velocity of the virtual different vehicle VC. The risk model 145 defines detailed model of the virtual different vehicle VC. For example, the legal speed may be assumed as the velocity of virtual different vehicle VC. As another example, the maximum speed at which the virtual different vehicle can stop immediately before the intersection is assumed as the velocity of the virtual different vehicle. When an object other than the vehicle, such as a motorbike, a bicycle, or a pedestrian is assumed as the intersecting moving object, the type and velocity of moving object assumed as the intersecting moving object may be included in the information related to the intersecting moving object.

The risk model 145 may represent a minimum set of reasonable assumptions defined for the foreseeable scenarios considered by the safety-related model used in the dynamic driving task. The minimum set of assumptions may define at least one of a maximum assumed velocity, a maximum assumed acceleration, a minimum assumed deceleration, a maximum assumed azimuth angle (yaw angle), a maximum assumed azimuth angle changing rate (yaw rate), a maximum assumed lateral direction position shift, and a maximum assumed response time. These parameters are parameters about other road users (for example, virtual vehicle), and indicate the reasonably foreseeable parameters. The velocity and the acceleration may be separately defined in longitudinal direction and in lateral direction.

When multiple virtual different vehicles VC exist, the velocity evaluation unit 143 may evaluate the upper limit or lower limit of velocity for each virtual different vehicle VC. When the virtual different vehicle VC is closer to the intersection compared with ego vehicle, the velocity evaluation unit 143 sets the upper limit velocity of ego vehicle at which the ego vehicle can avoid collision with the virtual different vehicle VC. When the ego vehicle SC is closer to the intersection compared with the virtual different vehicle, the velocity evaluation unit 143 sets the lower limit velocity of ego vehicle at which the ego vehicle can avoid collision with the virtual different vehicle VC. That is, within the reasonably foreseeable assumption range, avoidance of collision is supported by the safety-related model as the theoretical guarantee that is usually adopted. In order to verify the theoretical guarantee using formal verification and falsification techniques, the assumed velocity of the virtual different vehicle VC, the upper limit velocity and the lower limit velocity set for ego vehicle SC may be sequentially stored in a memory. The details of setting the upper limit velocity or the lower limit velocity by the velocity evaluation unit 143 will be described later.

The velocity range integrated evaluation unit 144 evaluates upper and lower limits of velocity of ego vehicle based on the upper limit velocity and lower limit velocity of ego vehicle calculated by the velocity evaluation unit 143. When only one virtual different vehicle VC exists, the upper limit velocity or lower limit velocity calculated by the velocity evaluation unit 143 are adopted. When multiple virtual different vehicles VC exist, the upper limit velocity and lower limit velocity calculated for each virtual different vehicle VC are considered in integrated manner, and a safe velocity range is calculated for the ego vehicle. The velocity range integrated evaluation unit 144 transmits data indicating the upper limit and lower limit of the safe velocity range.

The application of the autonomous driving vehicle 1 will be described with reference to FIG. 2. The control unit 150 uses the data, which indicates the upper limit and lower limit of the velocity and is transmitted from the risk evaluation unit 140, to optimize a path plan of the vehicle and make a control decision at an early timing. These functions may be included in the functions of dynamic driving task implemented by the overall ECU 30 or the like in the autonomous driving system. The dynamic driving task may include entire real-time maneuver and strategy function required to operate the vehicle in road traffic. The functions of dynamic driving task may include vehicle strategic behavior planning function, trajectory planning function, vehicle motion control demand generating function, and vehicle motion control function. The dynamic driving task may include improvement in notifying of ego vehicle toward the occluded area using lighting or horn when the virtual different vehicle VC is assumed to be existing in the occluded area.

The optimization of path plan is a function of optimizing the path that the ego vehicle is required to travel. A path plan optimization 151 using data indicating upper limit and lower limit of velocity may be used, for example, in adaptive cruise control (ACC), lane keeping assist system (LKA), lane change assist system (LCA), or autonomous driving performed with automated level of 3 or higher. An early control decision 152 is a function of making a control decision at an early stage on the premise of existence of virtual different vehicle although a vehicle cannot be confirmed due to the occluding object. For example, an early decision can be made in automatic emergency brake (AEB) or automatic emergency steering (AES). In the present embodiment, the control decision made by the autonomous driving vehicle 1 can be used to implement common-sense behavioral characteristics that a human driver regards as the safe driving in responsibility sensitive safety (RSS). For example, the control decision made by the autonomous driving may be used in a safety force field (SFF, registered trademark) risk monitoring function.

Figure 6:
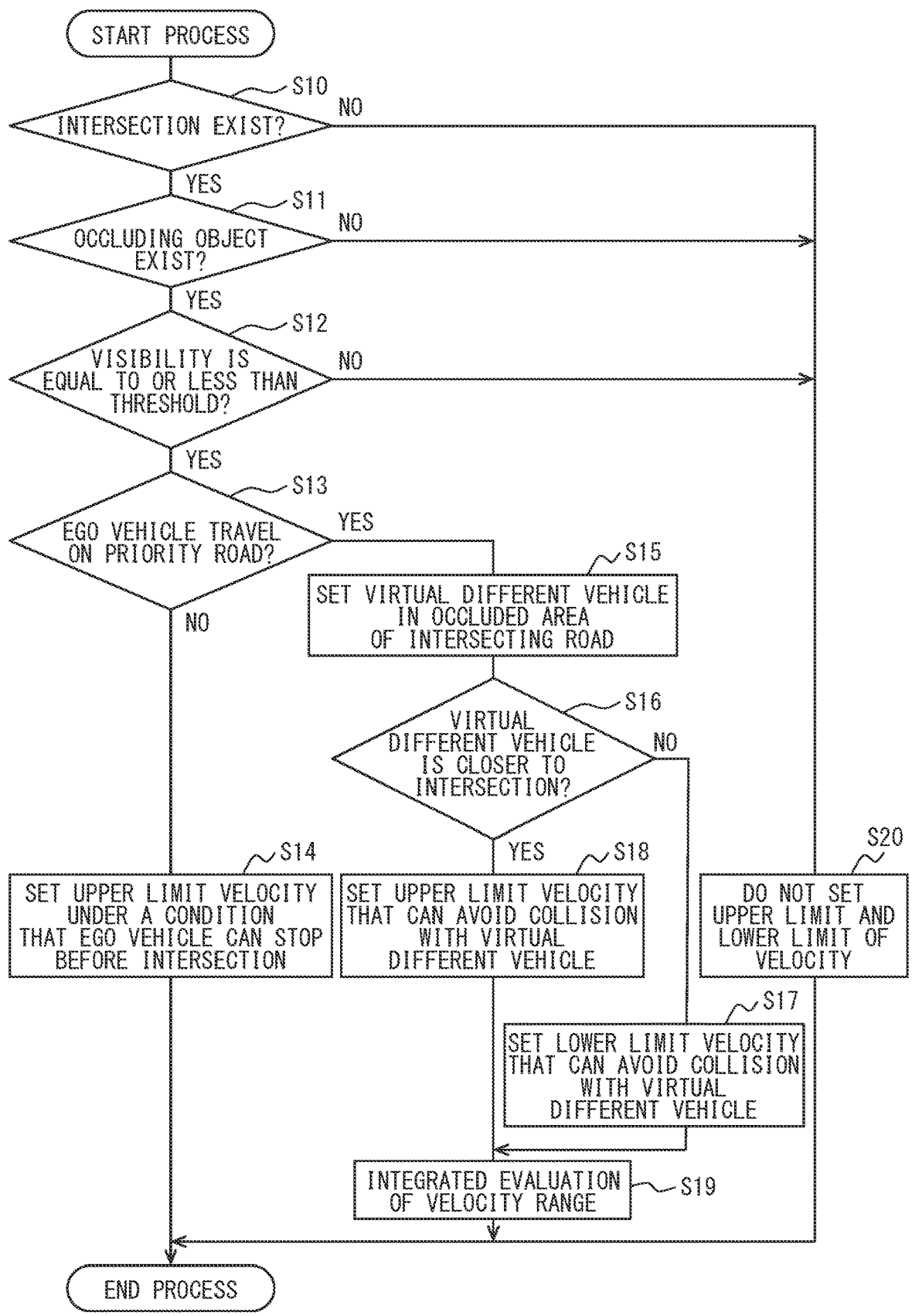
FIG. 6 is a flowchart showing a velocity evaluation process.

FIG. 6 is a flowchart showing a process in which the autonomous driving vehicle evaluates a safe velocity of ego vehicle when the intersecting road has an occluding object. The process shown in FIG. 6 is executed by the overall ECU 30.

Based on the data acquired by the various sensors 10, the autonomous driving vehicle 1 recognizes the traveling road and surrounding objects, estimates the current traveling position of ego vehicle, and specifies the traveling position on the map. The overall ECU 30 uses these estimation results to determine whether an intersecting road exists ahead of the road (S10). When determining no intersecting road exists (NO in S10), the overall ECU 30 does not set the upper limit and lower limit of velocity (S20).

When determining existence of an intersecting road (YES in S10), the overall ECU 30 determines whether the visibility of intersecting road is limited by the occluding object (S11). When no occluding object exists in the intersecting road (NO in S11), the overall ECU 30 does not set the upper limit and lower limit of velocity (S20).

The overall ECU 30 determines whether the visible range of the intersecting road within which the intersecting road is visible is equal to or less than a predetermined threshold (S12). When determining the visible range of the intersecting road is greater than the predetermined threshold (NO in S12), the overall ECU 30 does not set the upper limit and lower limit of velocity (S20). When determining the visible range of the intersecting road is equal to or less than the predetermined threshold (YES in S12), the overall ECU 30 sets the velocity range. The predetermined threshold may be set as a distance at which the intersecting vehicle can stop immediately before the intersection with a margin. The visible range of intersecting road increases as the ego vehicle approaches the intersection.

Figure 7A:
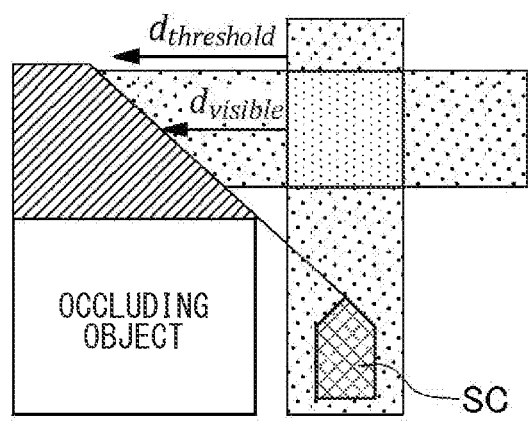
FIG. 7A is a diagram showing a visible area of an intersecting road.
Figure 7B:
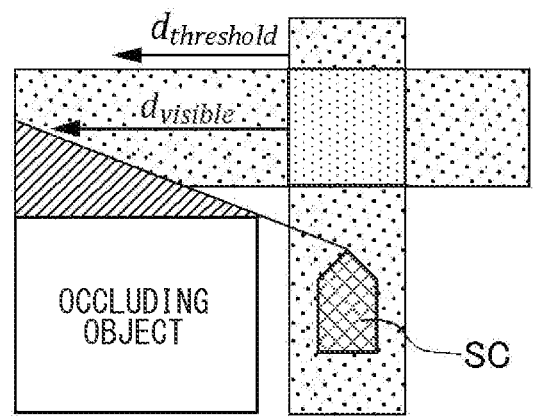
FIG. 7B is a diagram showing a visible area of an intersecting road.

FIG. 7A is a diagram showing the visible range $d_{visible}$ when the ego vehicle SC is distant from the intersection, and FIG. 7B is a diagram showing the visible range $d_{visible}$ when the ego vehicle SC is close to the intersection. As shown in FIG. 7A, the visible range $d_{visible}$ is less than or equal to the predetermined threshold $d_{threshold}$ when the ego vehicle is distant from the intersection and when the ego vehicle SC approaches, the visible range $d_{visible}$ becomes greater than the predetermined threshold $d_{threshold}$ as shown in FIG. 7B. When the visible range $d_{visible}$ becomes larger than the predetermined threshold $d_{threshold}$, the upper and lower velocity limits are not set, and vehicle control is executed based on data actually detected by various sensors 10. For example, when the sensor 10 detects no intersecting vehicle as a detection result, the ego vehicle may be accelerated within the legal speed range.

When the visibility is limited by the occluding object at a level equal to or less than the predetermined threshold (YES in S12), the overall ECU 30 calculates the upper limit and lower limit of safe velocity required for the ego vehicle. The overall ECU 30 determines whether the ego vehicle is traveling on the priority road (S13). When the vehicle is traveling on a non-priority road (NO in S13), the overall ECU 30 sets a maximum velocity of ego vehicle on the premise that the ego vehicle can stop immediately before the intersection (hereinafter referred to as "maximum velocity at which the vehicle can stop") as the upper limit velocity $v_{limit}$ (S14). The upper limit velocity $v_{limit}$ is calculated by the following numerical expression (1).

(Expression 1)
$$v_{limit} = \sqrt{b^2\rho^2 + ab\rho^2 + 2ad_{stop}} - (a+b)\rho \quad (1)$$
wherein $a = a_{max,accel}$
$b = a_{min,brake}$ In the above expression (1), $a_{max,accel}$ is the maximum accelerator value during idling state, p is the reaction time, $a_{min,brake}$ is the strength of brake, and $d_{stop}$ is the distance from the intersection to the ego vehicle.

When the ego vehicle is determined to be traveling in the priority road, (YES in S13), the overall ECU 30 sets a virtual different vehicle in the occluded area of the intersecting road (S15). For example, when multiple occluded areas exist on the intersecting road as shown in FIG. 5B, a virtual different vehicle is set for each occluded area. Then, for each virtual different vehicle set in S15, the overall ECU 30 determines whether the virtual different vehicle is closer to the intersection than the ego vehicle (S16). That is, the overall ECU 30 determines which one is closer to the intersection.

When the ego vehicle is closer to the intersection than the virtual different vehicle (NO in S16), the overall ECU 30 sets the lower limit of velocity for the ego vehicle so that the ego vehicle can avoid a collision with the intersecting vehicle (S17). That is, when the ego vehicle passes through the intersection prior to the intersecting vehicle, the velocity of ego vehicle is not decreased in order to avoid a collision with the intersecting vehicle. The lower limit velocity $v_{f,min}$ is calculated by the following numerical expression (2).

(Expression 2)
$$v_{f,min} = \sqrt{2b_f\left(v_r\rho + \frac{1}{2}a_r\rho^2 + \frac{(v_r + a_r\rho)^2}{2b_r} - d\right)} \quad (2)$$
wherein $b_f = a_{max,brake}$ $a_r = a_{max,accel}$ $b_r = a_{min,brake}$ In the expression (2), $a_{max,brake}$ is the strength of brake applied to the ego vehicle, and $v_r$ is the velocity of virtual different vehicle. As the velocity $v_r$ of the virtual different vehicle, the maximum velocity is set under a condition that the virtual different vehicle can stop immediately before the intersection. The maximum velocity under a condition that the virtual different vehicle can stop immediately before the intersection can be obtained from the above expression (1). In the expression (2), d is a virtual inter-vehicle distance assume that the virtual different vehicle is traveling on the same road as the ego vehicle. Using the symbols $d_{visible}$ and $d_{xing}$ shown in FIG. 5A, the distance d may be expressed as $d = |d_{visible} - d_{xing}|$.

When the virtual different vehicle is closer to the intersection than the ego vehicle (YES in S16), the overall ECU 30 sets the upper limit of velocity for the ego vehicle so that the ego vehicle can avoid a collision with the intersecting vehicle (S18). That is, when the ego vehicle passes through the intersection after the intersecting vehicle passes through the intersection, the velocity of ego vehicle is not increased in order to avoid a collision with the intersecting vehicle. The upper limit velocity $v_{r,max}$ is calculated by the following numerical expression (3).

(Expression 3)

$$v_{r,max} = \sqrt{b_r\left(2d + \frac{v_f^2}{b_f} + b_r\rho^2 + a_r\rho^2\right)} - (a_r + b_r)\rho \quad (3)$$

wherein $b_f = a_{max,brake}$ $a_r = a_{max,accel}$ $b_r = a_{min,brake}$

When the setting of the upper limit velocity and the lower limit velocity of ego vehicle is completed for each set virtual different vehicle, the overall ECU 30 performs an integrated evaluation of the velocity range (S19). That is, the range in which the velocity range set for each virtual different vehicle overlap with one another is set as the safe velocity range. The safe velocity range is used as a constraint formulated in the strategic behavior planning function of the dynamic driving task.

The control device, the control method, and the program according to the present embodiment are described as above. The overall ECU 30 of the autonomous driving vehicle 1 according to the present embodiment sets a safe velocity range so that the vehicle can safely pass through the intersection even though the visibility of the intersecting road is limited by the occluding object existing in the intersecting road.

Although the configuration and operation of the overall ECU 30 according to the present embodiment have been described above in detail, the control device according to the present disclosure is not limited to the embodiment described above. In the above-described embodiment, the velocity $v_r$ of the virtual different vehicle is set to the maximum velocity under a condition that the virtual different vehicle can stop immediately before the intersection. Alternatively, the velocity $v_r$ of the virtual different vehicle may be set as the legal speed set for the intersecting road where the virtual different vehicle is traveling, the an average of vehicle velocities of vehicles traveling on the road where the virtual different vehicle is traveling, the maximum velocity of a vehicle that travels on the same road as the virtual different vehicle, or the like.

Figure 8:
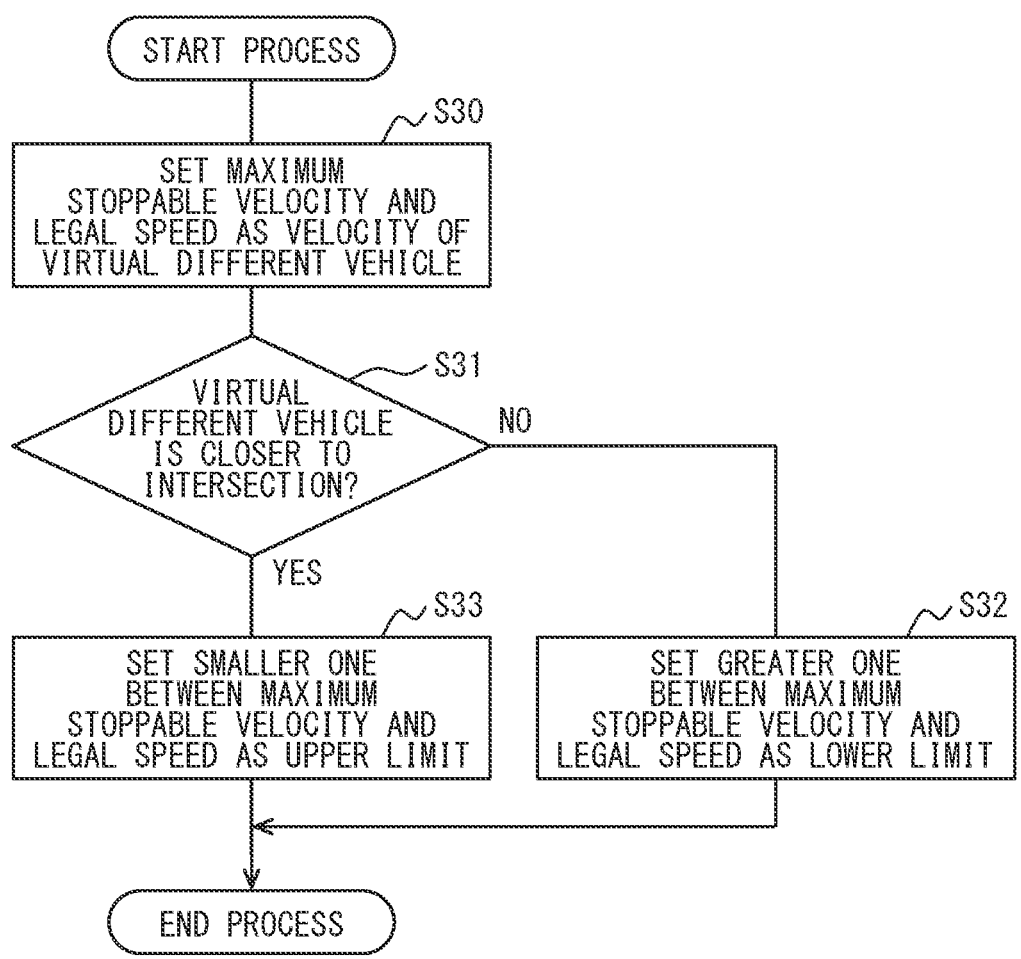
FIG. 8 is a flowchart showing an operation that is executed using both of a maximum stoppable velocity and a legal speed.

In another example, as the velocity $v_r$ of the virtual different vehicle, both of the maximum velocity under a condition that the virtual different vehicle can stop immediately before the intersection and the legal speed may be used. FIG. 8 is a flowchart showing a setting process of the upper limit velocity, lower limit velocity using both of the maximum velocity under a condition that the virtual different vehicle can stop immediately before the intersection and the legal speed.

The process sets the maximum velocity under a condition that the virtual different vehicle can stop immediately before the intersection and the legal speed as the velocity $v_r$ of the virtual different vehicle (S30). When the ego vehicle is closer to the intersection compared with the virtual different vehicle (NO in S31), the overall ECU 30 uses, as the velocity $v_r$ of the virtual different vehicle, the larger velocity between the maximum velocity set under a condition that the virtual different vehicle can stop immediately before the intersection and the legal speed, and then sets the lower limit velocity of the ego vehicle (S32). As a result, even though higher velocity is assumed as the velocity at which the virtual different vehicle enters the intersection, it is possible to set a velocity range of ego vehicle to avoid a collision with the virtual different vehicle.

When the virtual different vehicle is closer to the intersection compared with the ego vehicle (YES in S31), the overall ECU 30 sets, as the velocity vu of the virtual different vehicle, the smaller velocity between the maximum velocity set under a condition that the virtual different vehicle can stop immediately before the intersection and the legal speed, and then sets the upper limit velocity of the ego vehicle (S33). As a result, even though lower velocity is assumed as the velocity at which the virtual different vehicle enters the intersection, it is possible to set a velocity range of ego vehicle to avoid a collision with the virtual different vehicle. When proper responses and traffic rules such as regulations conflict, as in this example, a prioritization may be performed to resolve conflicts to minimize the risk based on safety-related model. In this example, the maximum velocity set under a condition that the virtual different vehicle can stop immediately before the intersection and the legal speed are described as two options. Alternatively, in addition to or instead of the above-described two velocity options, (i) an average value of velocities of vehicles traveling on the same road as the intersecting moving object or (ii) a maximum velocity of a vehicle among multiple vehicles traveling on the same road as the intersecting moving object may be used when setting the velocity range of ego vehicle. That is, (i) the maximum velocity set under a condition that the virtual different vehicle can stop immediately before the intersection, (ii) the legal speed, (iii) the average value of velocities of vehicles traveling on the same road as the intersecting moving object, and (iv) the maximum velocity of a vehicle among multiple vehicles traveling on the same road as the intersecting moving object may be used in any combination, or one of the velocity options (i) to (iv) may be used to set the velocity range of ego vehicle.

In determination of priority road, if it is hard to determine which road has the right of way between the traveling road of ego vehicle and the intersecting road, the vehicle traveling from the left side road relative to the ego vehicle may be determined to have the right of way. In this case, when an occluding object exists along the intersecting road located on left side relative to the ego vehicle, the maximum velocity, which is set under a condition that the ego vehicle can stop immediately before the intersection, is set as the upper limit velocity. When an occluding object exists along the intersecting road located on right side relative to the ego vehicle, a virtual different vehicle is set within the occluded area and the upper and lower limits of velocity are set. When occluding objects exist along the intersecting road on both of left and right sides, the safe velocity range of ego vehicle is determined as an overlapping range of the maximum velocity set when the occluding object exists on the left side and the upper and lower limits of velocity set when the occluding object exists on the right side. This example is described on the premise of left-hand traffic as in Japan. In a country where the right-hand traffic is adopted, for example, as United States, the vehicle traveling from the intersecting road on the right side relative to the ego vehicle is determined to have the right of way.

In the above-described embodiment, the operation contents are set different based on the determination result of priority road or non-priority road. Alternatively, the virtual different vehicle may be set in the occluded area and the safe velocity range of ego vehicle may be calculated based on the set virtual different vehicle regardless of whether the traveling road of ego vehicle is the priority road or the non-priority road. When information indicating presence or absence of different vehicle in the occluded area of ego vehicle sensor is obtained by V2X, the information obtained by V2X does not necessarily detect the presence of all other different vehicles. Thus, the safe velocity range may be set under the premise that the occluded area exists. With this configuration, the ego vehicle can pass through the intersection with higher safety.

In the above-described embodiment, the intersecting moving object is assumed to be a vehicle. As another example, the intersecting moving object may be a motorbike, a bicycle, a pedestrian, or the like. In that case, since the moving velocity differs depending on the type of the moving object, the velocity of the virtual moving object may be determined by referring to a lookup table that stores moving velocity data for each type of moving object in advance.

INDUSTRIAL APPLICABILITY

The present disclosure can determine a safe driving velocity range of a vehicle at an intersection having a limited visibility, and can be applied to autonomous driving and advanced driver assistance system.

What is claimed is:

1. A control device controlling a velocity of a vehicle, the control device comprising:
a scene determination unit determining a scene in which a visibility is limited by an occluding object at an intersection where a traveling road of the vehicle intersects with an intersecting road, the scene determination unit further determining whether the vehicle on the traveling road has a right of way; and
a control unit controlling the velocity of the vehicle by setting a maximum velocity, as an upper limit velocity of the vehicle, at which the vehicle can stop immediately before the intersection when the vehicle on the traveling road has no right of way.

2. The control device according to claim 1, further comprising:
a virtual moving object setting unit setting, within an area occluded by the occluding object, an intersecting moving object at a position closest to the intersection; and
a velocity evaluation unit setting a velocity of the intersecting moving object,
wherein, in response to the vehicle on the traveling road being determined to have the right of way, the control unit controls the velocity of the vehicle to not collide with the intersecting moving object based on the position and the velocity of the intersecting moving object.

3. The control device according to claim 2, wherein the velocity evaluation unit sets a reasonably foreseeable velocity as the velocity of the intersecting moving object.

4. The control device according to claim 3, wherein, when the intersecting moving object is closer to the intersection than the vehicle, the velocity evaluation unit sets, as the reasonably foreseeable velocity of the intersecting moving object, at least one of (i) a maximum velocity under a condition that the intersecting moving object can stop immediately before the intersection, (ii) a legal speed, (iii) an average value of velocities of vehicles travelling on a same road as the intersecting moving object, (iv) a maximum value among the velocities of the vehicles travelling on the same road as the intersecting moving object, or (v) a minimum velocity among the velocities (i) to (iv), and the control unit controls the vehicle to travel at the velocity, an upper limit of which is set to avoid a collision with the intersecting moving object.

5. The control device according to claim 3, wherein, when the vehicle is closer to the intersection than the intersecting moving object, the velocity evaluation unit sets, as the reasonably foreseeable velocity of the intersecting moving object, at least one of (i) a maximum velocity under a condition that the intersecting moving object can stop immediately before the intersection, (ii) a legal speed, (iii) an average value of velocities of vehicles travelling on a same road as the intersecting moving object, (iv) a maximum value among the velocities of the vehicles travelling on the same road as the intersecting moving object, or (v) a maximum velocity among the velocities (i) to (iv), and the control unit controls the vehicle to travel at the velocity, a lower limit of which is set to avoid a collision with the intersecting moving object.

6. The control device according to claim 2, wherein, when the visibility is limited by multiple occluding objects, for each of areas occluded by the multiple occluding objects, the virtual moving object setting unit sets the intersecting moving object at the position closest to the intersection,
the velocity evaluation unit sets the velocity of each intersecting moving object, and
the control unit controls the velocity of the vehicle to not collide with each intersecting moving object based on the position and the velocity of each intersecting moving object.

7. The control device according to claim 1, wherein, when a distance from the intersection to a visible area of the intersecting road, which is not occluded by the occluding object, becomes longer than a predetermined threshold as the vehicle approaches the intersection, the control unit controls the velocity of the vehicle based on detection data of an intersecting moving object traveling on the intersecting road.

8. The control device according to claim 1, wherein the maximum velocity ($v_{limit}$) of the vehicle is calculated by the following expression:

$$v_{limit} = \sqrt{b^2 p^2 + abp^2 + 2ad_{stop}} - (a+b)p$$

wherein
a is a maximum accelerator value during an idling state,
p is a reaction time,
b is a strength of brake, and
$d_{stop}$ is a distance from the intersection to the vehicle.

9. A control device controlling a velocity of a vehicle, the control device comprising:
a virtual moving object setting unit setting, in a scene where a visibility is limited by an occluding object at an intersection where a traveling road of the vehicle intersects with an intersecting road, an intersecting moving object at a position closest to the intersection within an area occluded by the occluding object;
a velocity evaluation unit setting a velocity of the intersecting moving object, wherein the velocity evaluation unit sets, as the velocity of the intersecting moving object, a maximum velocity at which the intersecting moving object can stop before the intersection in a case where the intersecting moving object has no right of way at the intersection; and a control unit controlling the velocity of the vehicle to not collide with the intersecting moving object based on the position and the velocity of the intersecting moving object.

10. The control device according to claim 9, wherein the maximum velocity ($v_{limit}$) of the intersecting moving object is calculated by the following expression:

$$v_{limit} = \sqrt{b^2 p^2 + ab\rho^2 + 2ad_{stop}} - (a+b)\rho$$

wherein a is a maximum accelerator value during an idling state,
p is a reaction time,
b is a strength of brake, and
$d_{stop}$ is a distance from the intersection to the intersecting moving object.

11. The control device according to claim 9, wherein the control unit determines whether the vehicle can enter the intersection according to a visible range of the intersecting road, and then sets the intersecting moving object in response to determining that the vehicle can enter the intersection.

12. A control method that controls a traveling of a vehicle, the control method comprising:
identifying, with a control device, a scene where a visibility is limited at an intersection where a traveling road of the vehicle intersects with an intersecting road;
determining, with the control device, whether the vehicle has a right of way at the intersection; and
automatically controlling, with the control device, the vehicle by setting a maximum velocity, as an upper limit velocity of the vehicle, at which the vehicle can stop immediately before the intersection in response to determining that the vehicle has no right of way at the intersection.

13. The control method according to claim 12, wherein the control device comprises an electronic control unit, which includes a processor and a non-transitory tangible storage medium, and
the vehicle is equipped with the control device.

14. A control method that controls a traveling of a vehicle, the control method comprising:
identifying, with a control device, a scene where a visibility is limited by an occluding object at an intersection where a traveling road of the vehicle intersects with an intersecting road;
assuming, with the control device, an intersecting moving object in an area occluded by the occluding object in the scene where the visibility is limited at the intersection;
assuming, with the control device, a velocity of the intersecting moving object; and
automatically controlling, with the control device, the vehicle to not collide with the intersecting moving object based on the assumed intersecting moving object,
wherein
a maximum velocity at which the intersecting moving object can stop before the intersection is set as the velocity of the intersecting moving object in a case where the intersecting moving object has no right of way at the intersection.

15. A control program product stored in a computer-readable non-transitory storage medium, the control program comprising instructions to be executed by at least one processor of a control device for controlling a velocity of a vehicle, the instructions comprising:
identifying, with the control device, a scene where a visibility is limited at an intersection where a traveling road of the vehicle intersects with an intersecting road;
determining, with the control device, whether the vehicle has a right of way at the intersection; and
automatically controlling, with the control device, the vehicle by setting a maximum velocity, as an upper limit velocity of the vehicle, at which the vehicle can stop immediately before the intersection in response to determining that the vehicle has no right of way at the intersection.

16. A control program product stored in a computer-readable non-transitory storage medium, the control program comprising instructions to be executed by at least one processor of a control device for controlling a velocity of a vehicle, the instructions comprising:
setting, with the control device, an intersecting moving object in a scene where a visibility is limited by an occluding object at an intersection where a traveling road of the vehicle intersects with an intersecting road, the intersecting moving object being set at a position closest to the intersection within an area occluded by the occluding object;
setting, with the control device, a velocity of the intersecting moving object; and
automatically controlling, with the control device, the velocity of the vehicle to not collide with the intersecting moving object based on the position and velocity of the intersecting moving object,
wherein
a maximum velocity, at which the intersecting moving object can stop before the intersection, is set as the velocity of the intersecting moving object in a case where the intersecting moving object has no right of way at the intersection.

* * * * *